(No Model.) 2 Sheets—Sheet 1.

J. K. HAWKINS.
COFFEE POT OR BOILER.

No. 435,302. Patented Aug. 26, 1890.

Witnesses:
E. P. Ellis.
D. Brackett.

Inventor:
J. K. Hawkins,
per
Lehmann & Pallison
Attys.

2 Sheets—Sheet 2.

J. K. HAWKINS.
COFFEE POT OR BOILER.

No. 435,302. Patented Aug. 26, 1890.

Witnesses:
P. Ellis,
Brockett,

Inventor:
J K Hawkins,
per Lehmann & Pattison,
Attys

UNITED STATES PATENT OFFICE.

JOHN K. HAWKINS, OF MOHAWK, TENNESSEE.

COFFEE POT OR BOILER.

SPECIFICATION forming part of Letters Patent No. 435,302, dated August 26, 1890.

Application filed May 12, 1890. Serial No. 351,537. (No model.)

*To all whom it may concern:*

Be it known that I, JOHN K. HAWKINS, of Mohawk, in the county of Greene and State of Tennessee, have invented certain new and useful Improvements in Coffee Pots or Boilers; and I do hereby declare the following to be a full, clear, and exact description of the invention, such as will enable others skilled in the art to which it pertains to make and use it, reference being had to the accompanying drawings, which form part of this specification.

My invention relates to an improvement in coffee pots or boilers; and it consists in the combination and arrangement of parts, which will be more fully described hereinafter.

My object is to provide a coffee-pot in which the coffee can be kept hot and in constant motion, so as to extract all of the strength from the grounds by means of steam, which is forced into the coffee-pot directly from the vessel in which the water is boiled.

Figure 1:
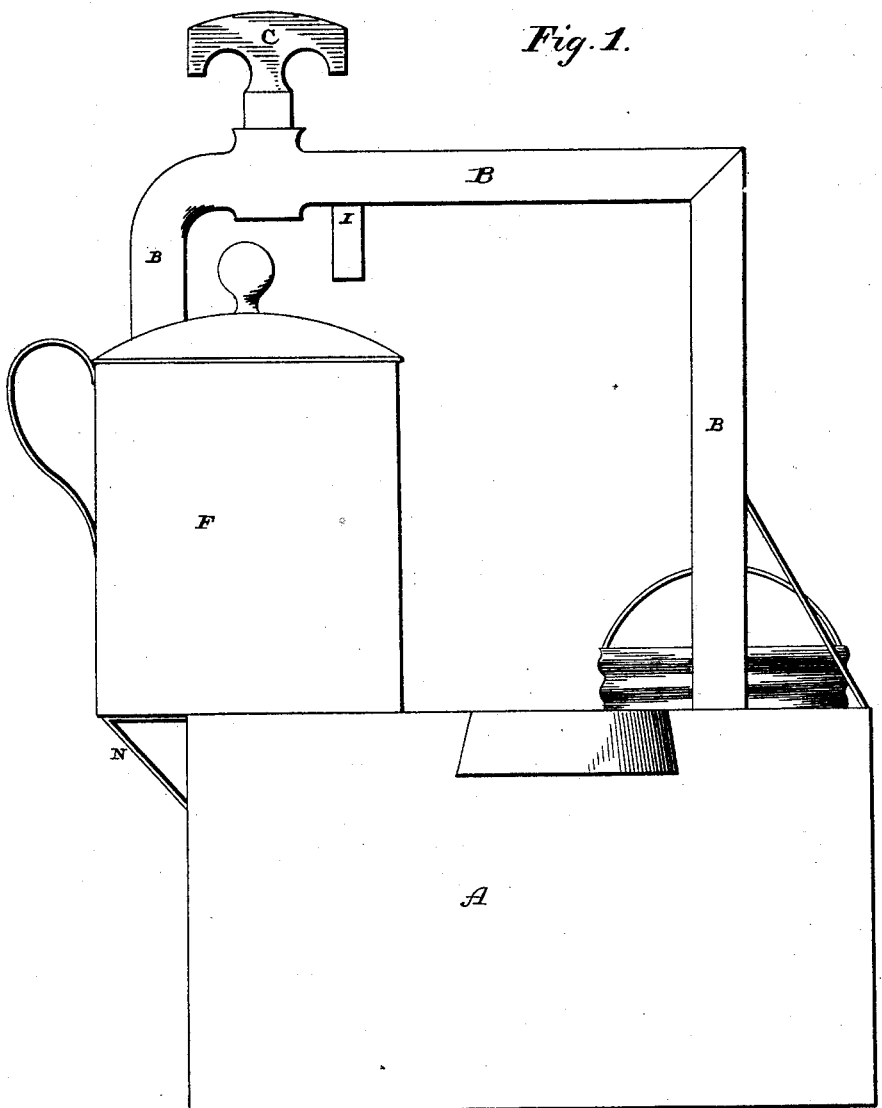
Figure 2:
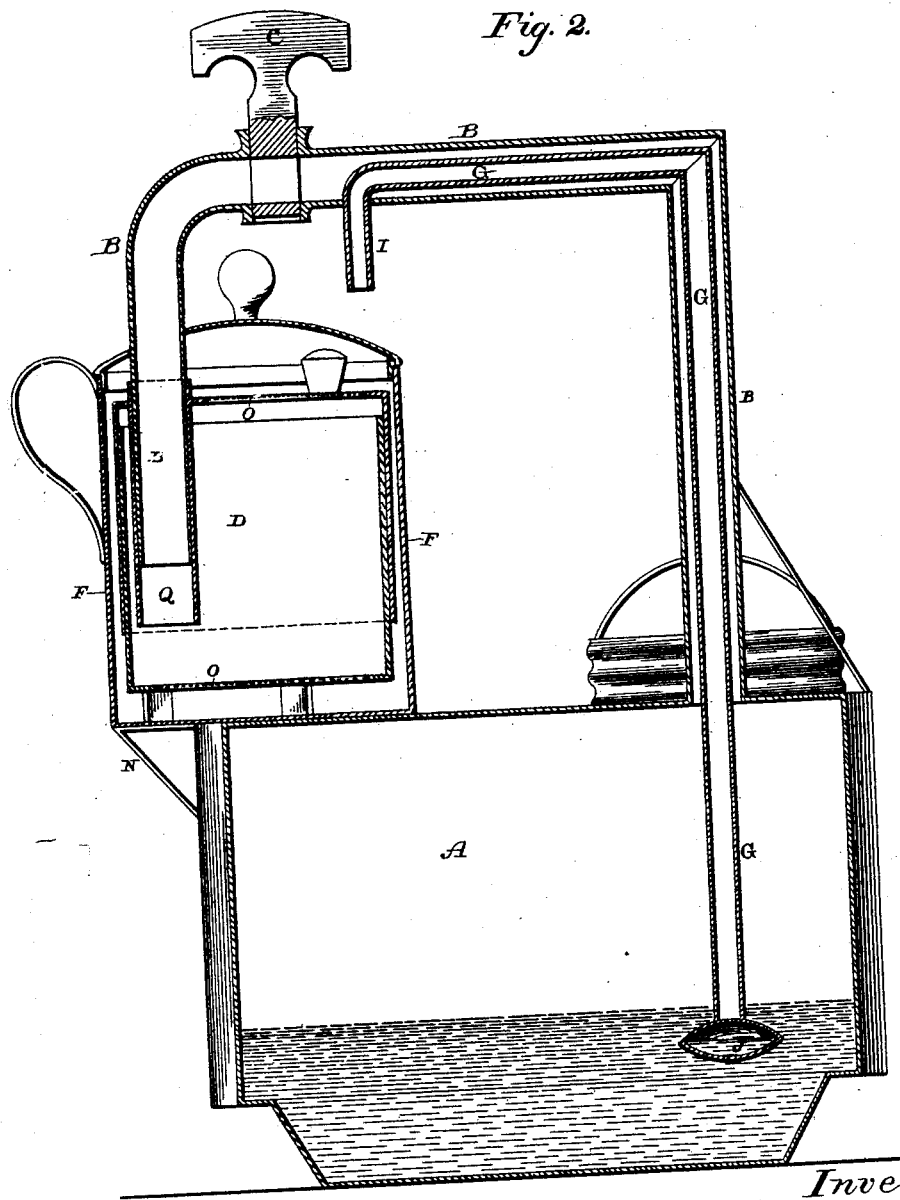

Figure 1 is a side elevation. Fig. 2 is a vertical section of a coffee pot or boiler which embodies my invention.

A represents an ordinary vessel of any suitable construction, which is to be partially filled with water and then set upon the stove. Extending from the top of this vessel A is the steam-pipe B, which is provided with a faucet C, and the outer end of this pipe B projects down into the coffee-holder D, which is placed in the coffee-pot F. The inner end of this pipe B extends only from the top of the vessel, and hence when the faucet is opened the steam passes directly from the vessel through the pipe B into the coffee-holder. Extending from near the bottom of the vessel A is a water-pipe G, which extends up through the pipe B and has its upper end I to project through the bottom of the pipe B in any desired proximity to the faucet. Upon the lower end of the water-pipe G is preferably placed a whistle J, so as to give notice when the low-water mark is reached. The end of this pipe G being submerged, if the faucet is closed the pressure of steam upon the top of the water forces the water up through the pipe G into the coffee-pot. As soon as the faucet is opened the flow of water through the pipe G ceases and the passage of the steam begins.

The coffee-pot is to be placed upon the top of the vessel A, which is provided with a support N at one side of the outer end of the pipe B for the purpose of assisting to support the pot in position. The opening in the cover for the insertion of the pipe B being at one side, as shown, and the support N at one side of the end of the pipe B, by turning the pot around so that the side in which the opening is made is next to the support N the pot can be lowered, and thus detached from the pipe B. The coffee-holder, which consists of a vessel of any suitable shape to hold the coffee-grounds, is provided with feet, so as to raise it slightly above the top of the bottom of the coffee-pot, and in each end is an opening of suitable size covered over with wire-gauze O, so as to allow a free circulation of water through the holder and coffee-pot. Projecting down through the top of the coffee-holder at one side is a pipe Q, which extends to near the bottom of the holder, and which is just large enough to receive the end of the pipe B. The top having been taken off of the coffee-holder, the ground coffee is inserted, the cover replaced, and then the holder is placed in the coffee-pot. The faucet is closed, so that the water will flow from the upper end of the water-pipe into the coffee-pot, and when there is a sufficient quantity of water in the coffee-pot the faucet is closed. The lower end of the pipe B is then inserted through the opening in the cover into the pipe, which extends down through the side of the coffee-holder, and then the steam from the vessel A is forced down into the bottom of the holder, so as to start a circulation of the water through the holder and the coffee-pot. The grounds are kept constantly in motion in the holder until all their strength is extracted and they are reduced to pulp.

In case it is so desired, vegetables and meats and other such articles can be cooked by being placed in a vessel, and the vessel then placed upon the top of the vessel A, with the lower end of the pipe B extending down into the articles being cooked. The steam will either cook or steam the articles, as may be desired, and hence my invention is adapted for a wider range of usefulness than simply making coffee alone.

Having thus described my invention, I claim—

The combination of the vessel A, provided with the pipe B, which extends from its top, the faucet placed in the pipe, and the water-pipe G, having its lower end to extend down near the bottom of the vessel and having its upper end to project through the pipe B, substantially as shown.

In testimony whereof I affix my signature in presence of two witnesses.

JNO. K. HAWKINS.

Witnesses:
D. W. EASTERLY,
JAMES RILEY.